Nov. 22, 1927.
S. B. CONDIT
ELECTRIC SWITCH
Filed July 22, 1922
1,650,190
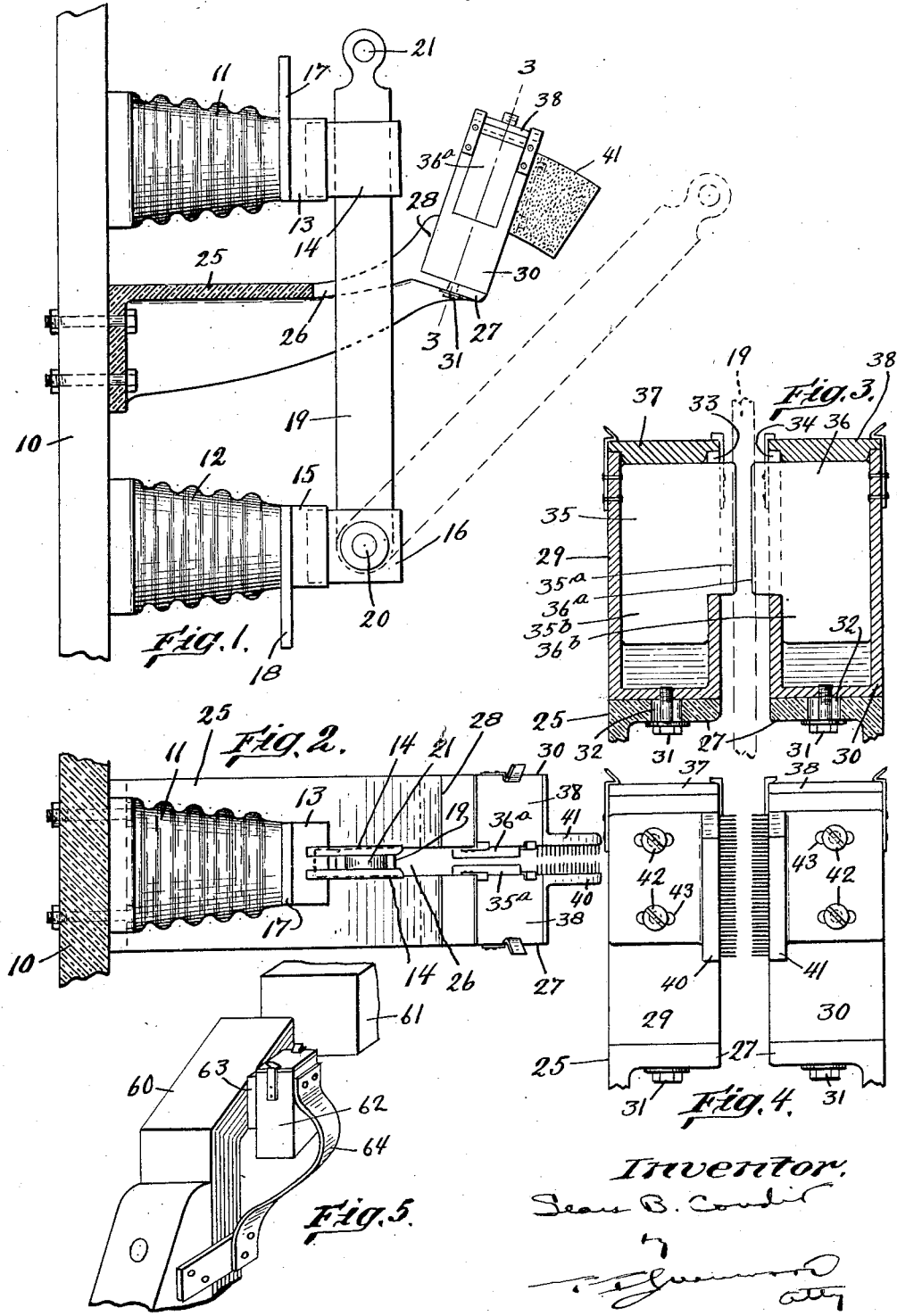

Patented Nov. 22, 1927.

1,650,190

UNITED STATES PATENT OFFICE.

SEARS B. CONDIT, OF BROOKLINE, MASSACHUSETTS, ASSIGNOR TO CONDIT ELECTRICAL MANUFACTURING CORPORATION, OF BOSTON, MASSACHUSETTS, A CORPORATION OF MASSACHUSETTS.

ELECTRIC SWITCH.

Application filed July 22, 1922. Serial No. 576,737.

This invention relates to electric switches and particularly to disconnecting switches.

Electric switching apparatus, especially for high tension work, includes a main switch, which is usually an oil immersed switch, adapted to control the circuit, and a disconnecting switch, which is usually an air break switch, and connected in series with the main switch. The chief function of the disconnecting switch is to isolate the main switch from the circuit, whereby to permit repairs to and inspection of the main switch without danger. The disconnecting switch is adapted to carry the load, but not interrupt it, and it is infrequently operated and may remain closed, or open, for relatively long periods.

Inasmuch as the contact members of the disconnecting switch are exposed to the atmosphere, the contact faces may become oxidized and increased heating at the contact junction may result, and the current-carrying capacity of the switch may be reduced. Because of the tendency to oxidize, the contact members of the disconnecting switch usually have very liberal dimensions as compared with an oil switch of equal current-carrying capacity.

An object of my invention is to provide an air break switch, and particularly a disconnecting switch of the air break type, with means to prevent or retard oxidation of the contact surfaces thereof.

A further object is to provide an electric switch with automatic cleaning means for the contact surfaces thereof, and especially for the contact surfaces of the movable switch member.

In carrying out the invention, I may provide means to wipe clean and also to apply a protective film of some suitable medium, as oil, for instance, to the contact surfaces, and I may so arrange the switch members that the cleaning action is applied automatically during the operation of the switch.

By reason of my invention, I may reduce appreciably the dimensions of the contact members of the switch and thereby reduce the cost of the switch for the reason that the current is carried between relatively clean contact surfaces, which permit relatively high current densities at the contact junction for a moderate rise of temperature, rather than between relatively oxidized contact surfaces which necessitate relatively low current densities for the same rise of temperature.

A further object of my invention is to improve the construction and operation of electric switches.

Certain features of this invention are disclosed in a copending application of William S. Edsall, Serial No. 576,709, filed July 22, 1922, and assigned to me.

Fig. 1 is a side elevation, partly in section, of an electric switch embodying my invention.

Fig. 2 is a plan view of the switch of Fig. 1.

Fig. 3 is a sectional view along line 3—3 of Fig. 1.

Fig. 4 is a front view, in detail, of the oil pots and brushes.

Fig. 5 is a modification, illustrating an application of the invention to a switch having a laminated brush member.

As here shown, my invention is applied to an electric switch of the air break type used particularly as a disconnecting switch. The switch may include the base 10 which is preferably of some insulating material and may support, in spaced relation, insulators 11 and 12. A fixed switch or contact member comprising the block 13 and spaced jaws on plates 14 may be mounted on the end of said insulator 11 and a similarly constructed member comprising the block 15 and the spaced plates 16 may be mounted on the end of the insulator 12. Circuit leads may be connected to the plates 17 and 18, which may comprise the terminal members of the switch. The movable switch or contact member may comprise the knife-blade 19 which is or may be received between the plates 16 and pivotally connected therewith by the bolts 20. Said blade is adapted to be moved to a position between the top plates 14, as indicated by the full line, Fig. 1, to complete the circuit through the switch, and be moved out of engagement with said plates to some position indicated by the dotted lines, Fig. 1, to interrupt the circuit. Said blade 19 is or may be provided with suitable engaging means as the eye 21 by which said blade may be engaged for operation.

The switch so far described is intended to be typical of any usual or suitable form of air break switch.

In accordance with my invention, I provide means to maintain the contact surfaces of the switch clean and relatively free from oxidation and, particularly, means to apply a protective film or coating of a suitable substance, as oil, to the contact surfaces, whereby to shield them from the oxidizing effect of the atmosphere. For this purpose, I may secure a bracket 25 to said base 10 between said insulators 11 and 12. Said bracket, preferably, is of suitable insulating material, and extends forwardly to a position in front of and below the fixed contact member carried by the top insulator 11. Said bracket is or may be formed or provided with a slot 26 adapted to admit the movable switch member or blade 19 in the switch-closing movement thereof.

The forward end of said insulating bracket may be formed or provided with the bottom walls 27 and rear walls 28 adapted to form seats or shelves for the pots 29 and 30.

Said pots are adapted to contain the protective substance to be applied to the contact surfaces of the switch and particularly to the contact surfaces of the blade 19. The protective medium may be a fluid, as oil, or it may be a solid or semi-solid, as vaseline, for instance, or any substance that will adhere to the contact surfaces and protect them from the oxidizing influence of the atmosphere.

Said pots 29 and 30 are disposed on opposite sides of the slot 26 in said bracket 25 and are received on the shelves formed by the walls 27 and 28 and are or may be secured to said shelves by the screws 31, which are or may be extended through slots 32 in said bottom walls 27 whereby to permit an adjustment of the pots relative to the movable blade 19 to bring wicks carried by said pots into suitable position to engage said blade. Said pots may be formed of insulating, or conducting, material and their proximate faces may be formed with the slots 33 and 34 therein through which wicks 35 and 36 are adapted to protrude, and the tops of said receptacles may be closed by the removable covers 37 and 38.

Said wicks 35 and 36 may be of any suitable material as felt, for instance, and of any suitable dimensions. As here shown, the wicks are of L-shaped formation and similar legs 35ᵃ and 36ᵃ respectively extend through the slots in the oil pots and into position to engage and wipe against the opposite sides or contact surfaces of the blade 19 as said blade is moved past the wicks into and also away from circuit-closing position. The other similar legs 35ᵇ and 36ᵇ respectively of said wicks may extend downwardly into the oil or other protective substances in said pots. Said wicks are adapted to absorb the oil or equivalent medium in the pots and conduct said medium to the exposed faces thereof. The space between said wicks is adapted to be somewhat less than the thickness of the blade 19 and the wicks are adapted to be yielding to permit said blade to wipe across both wicks and become covered with a coating of the protecting medium on its contact surfaces. Said blade receives a coating when it is moved toward circuit-closing position and applies the coating to the contact surfaces of the fixed contact member whereby to cover and protect said surfaces during the period the switch is closed, and the protective coating may remain on said surfaces during the period that the switch is open. A coating of the protective material is also applied to the blade 19 as it is moved into open-circuit position whereby to replenish the protective coating and protect the contact surfaces of said blade during the period that it remains in open-circuit position.

If desired, suitable brush-members 40 and 41 having, preferably, wire teeth, or other abrading means, may be secured to said pots 29 and 30, or be otherwise supported in front of said pots to be engaged by and wipe the blade 19 as it is moved to and from switch-closing position whereby to abrade and brighten the contact surfaces and remove oxide that may have formed thereon. Said brush members may be adjustably secured to said pots by screws 42 which are passed through slots 43 in said brush members, whereby to permit suitable engagement of said brush members with respect to the blade 19.

If desired, the protective substance may be omitted and the wicks 35 and 36 will then constitute wiping pads which will be engaged by the movable switch member and will wipe clean the contact surfaces thereof.

In Fig. 5, I have illustrated my invention applied to a form of air break switch wherein the movable switch member may include the brush-member 60 formed of a plurality of closely spaced leaves and adapted to engage the fixed contact block 61. With such a switch I may apply the protective medium to the side edge of the brush member and the protective medium will be carried to the contact face of the brush member by capillary action due to the close spacing of the leaves, and also by the spreading and subsequent closing action of the brush member as it engages and disengages the fixed contact block.

For this purpose an oil pot 62 having the wick 63 may be pressed into yielding engagement with a side face of the brush member by the spring-member 64 which also is or may be the supporting member for the oil pot, and said spring-member may be secured to the movable switch-member in any suitable manner.

The construction may be otherwise modified without departing from the spirit of the invention, and I do not intend to confine my invention to the precise structure herein set forth. For instance, the wicks or equivalent means may apply some material to the contact surfaces of the switch members which has the property of chemically or otherwise removing the oxide that may form thereon or restoring the contact surfaces thereof.

I claim:

A disconnecting knife-blade switch for high-tension circuits comprising a supporting base, a pair of spaced pillar-type insulators carried by and extended outwardly of said base, one of said insulators having a terminal-member including a hinge, said other member having a terminal-member including a pair of opposed contact-jaws, a knife-blade pivoted to said hinge and adapted to move into and out of position between and engagement with said jaws, said knife-blade having an operating-hook engaging-section at its free end which is located beyond said jaws in the closed position of the switch, and cleaning means for the contact-faces of said knife blade comprising a pair of oil-pots located in front of said jaws on opposite sides of the path of movement of said knife-blade and spaced apart to permit said knife-blade to pass between them, oil-pads carried by said oil-pots and extended through opposed openings in said pots toward and spaced from each other in position to engage the opposite contact-faces of said knife-blade as said knife-blade is moved between them, and a supporting bracket for said pots carried by said base and insulated from said terminal members.

In testimony whereof, I have signed my name to this specification.

SEARS B. CONDIT.